Figure 1:
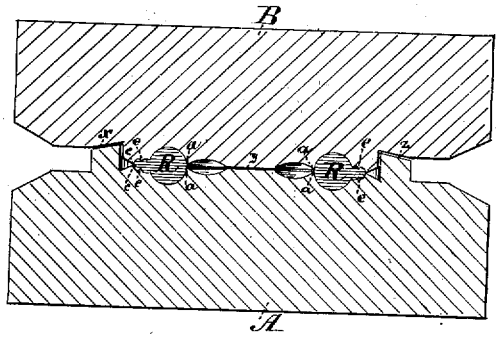
Figure 2:
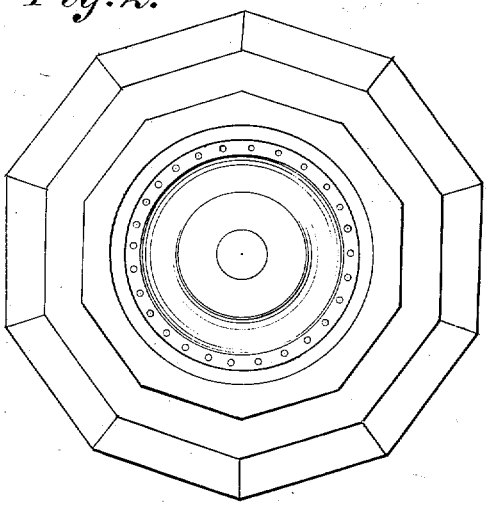

A. ALBRIGHT.

Manufactucture of Rubber-Coated Harness-Trimmings.

No. 5,156.

Reissued Nov. 26, 1872.

Witnesses:

V. C. Clayton

T. G. Clayton

Andrew Albright,

Inventor:

by atty,

J. C. Clayton

UNITED STATES PATENT OFFICE.

ANDREW ALBRIGHT, OF NEWARK, NEW JERSEY.

IMPROVEMENT IN THE MANUFACTURE OF RUBBER-COATED HARNESS-TRIMMINGS.

Specification forming part of Letters Patent No. 123,603, dated February 13, 1872; antedated January 27, 1872; reissue No. 5,156, dated November 26, 1872.

DIVISION B.

*To all whom it may concern:*

Be it known that I, ANDREW ALBRIGHT, of Newark, New Jersey, have invented an improved process for manufacturing Harness-Trimmings covered with vulcanized rubber, gutta-percha, or other known vulcanizable gum, of which the following is a specification:

My invention consists of an improved process for manufacturing rubber-coated harness-trimmings. There are three principal operations which form the combined process which is the subject-matter of this specification: First, the preparation and application of the coating to the metal; second, the vulcanization of the coating; third, the compressing and finishing in the dies.

The metallic ring, buckle, terret, or other article to be coated is first carefully cleaned by washing and drying until free from dust or other impurities, which might prevent a perfect adhesion of the coating. This coating may be of rubber, gutta-percha, or other known vulcanizable gum properly prepared for vulcanization.

I have attained the best results with the following process: I first take a good quality of the rubber and sulphur composition commonly used, consisting of about two parts of rubber to one part of sulphur. This composition should be of a consistence about equal to that of stiff dough, although the composition or paste may be thinner. I then apply a thin coating of the composition—which is easiest done when rolled into sheets of uniform thickness—to the article, working and pressing it firmly to the metal by the hand or otherwise. The article thus coated with the vulcanizable gum is then placed in a mold of the proper shape, so as to keep the coating in due thickness and proportion; or the articles may be packed in stone-dust or plaster, as usual, with other rubber goods. The articles in their molds or packing are then placed in the vulcanizing-oven, and remain in the usual vulcanizing temperature from six to ten hours, until sufficiently hardened. After being thus vulcanized the articles are ready for the action of the dies.

The dies to be used in this process should be a very little smaller than the article to be pressed, so that they may thoroughly compress and densify the coating upon the metal. They should have cutting-edges so as to shear off the superfluous coating, and should be provided with suitable indentations or engraving so as to produce the desired ornamentation. Such dies are more fully described in Division A of this specification. The dies, now being ready, are slightly heated, and the vulcanized articles—which it is better to have heated—are put one at a time in the lower die, while the upper die is pressed or dropped down upon it with great pressure. As the dies act upon the coating with equal pressure in all directions the coating is made homogeneous, dense, hard, tough, and susceptible to high polish, and is rendered more durable and better than if it were not so pressed. The dies at the same time cut off the superfluous coating, apply ornamentation, if desired, and impart a considerable polish, thus doing away with much labor in "tumbling," finishing, and polishing.

Various vulcanizable compositions may be used in my combined process.

What I claim is—

The herein-described combined process of manufacturing metallic harness-trimmings covered with rubber, gutta-percha, or other known vulcanizable gums.

ANDREW ALBRIGHT.

Witnesses:

J. C. CLAYTON,

T. B. BEECHER.